July 18, 1967     H. J. GERBER     3,331,257
LEAD SCREW AND NUT
Filed Sept. 24, 1965     2 Sheets-Sheet 1
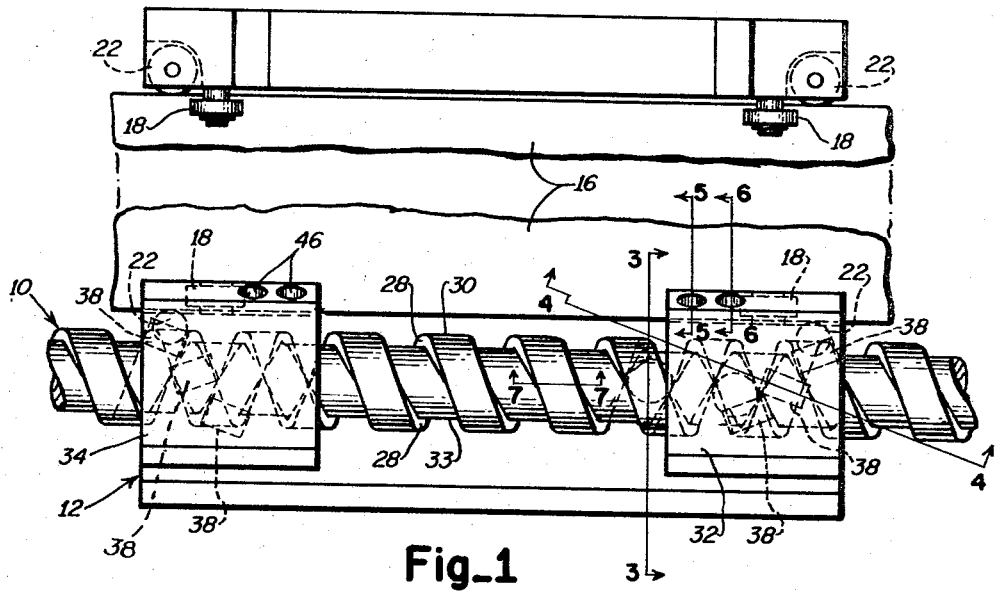
Fig_1
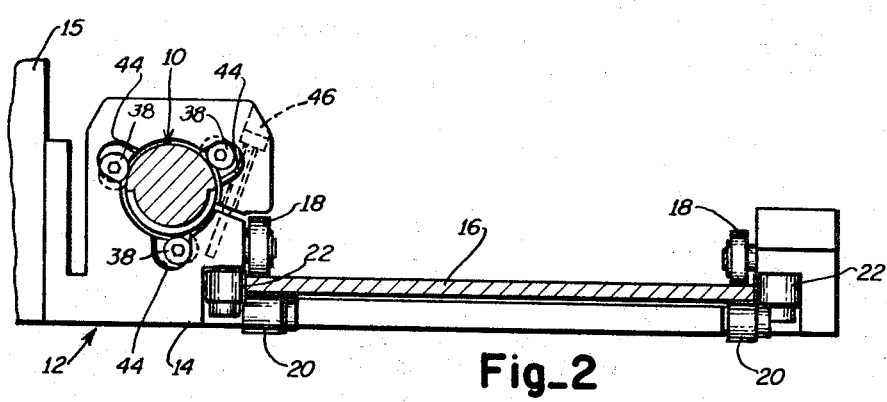
Fig_2
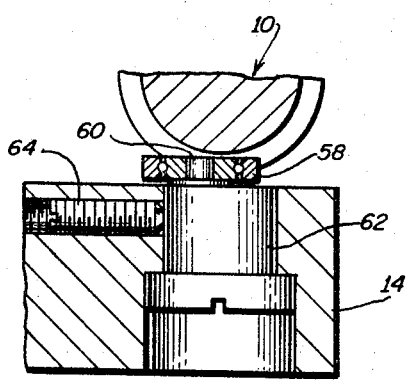
Fig_3
INVENTOR.
HEINZ JOSEPH GERBER
BY McCormick, Paulding & Huber
ATTORNEYS July 18, 1967     H. J. GERBER     3,331,257
LEAD SCREW AND NUT Filed Sept. 24, 1965     2 Sheets-Sheet 2

3,331,257
LEAD SCREW AND NUT
Heinz Joseph Gerber, West Hartford, Conn., assignor to The Gerber Scientific Instrument Company, Inc., South Windsor, Conn., a corporation of Connecticut
Filed Sept. 24, 1965, Ser. No. 489,808
11 Claims. (Cl. 74—424.8)

This invention relates to an improved lead screw and nut mechanism and deals more particularly with an improved mechanism for accurate high speed translatory motion transmission and part positioning.

In its broadest aspect, the invention contemplates the employment of a highly efficient low friction adjustably coupled nut and screw mechanism to impart rectilinear motion to a load connected to the nut. The apparatus of the present invention is particularly well adapted for use in moving the carriages on an X-Y plotter of the type generally described in the copending application of Gerber and Logan, Ser. No. 228,289 entitled X-Y Plotter, filed Oct. 4, 1962, now Patent No. 3,293,651, and assigned to the same assignee as this application. The invention is, however, applicable to other uses and should prove particularly well suited for use on machine tools, scientific instruments and the like.

In order to achieve accuracy in high speed operation, a plotter of the aforedescribed general type usually employs a precision motion transmission apparatus such as a lead screw mechanism of the recirculating ball type. Such mechanisms are very costly because of the high precision machining necessary to hold the parts within the narrow tolerance limits required.

The general object of this invention is to provide an improved lead screw and nut mechanism for accurate high speed motion transmission and part positioning, which may be manufactured more economically than existing ones of comparable speed and accuracy.

Another object of the invention is to provide a low friction lead screw and nut mechanism which may be readily adjusted to minimize backlash and radial play.

The drawings show a preferred embodiment of the invention and such embodiment will be described, but it will be understood that various changes may be made from the constructions disclosed, and that the drawings and description are not to be construed as defining or limiting the scope of the invention, the claims forming a part of this specification being relied upon for that purpose.

FIG. 1 is a plan view of a lead screw and nut mechanism embody the invention.

FIG. 2 is an end view of the mechanism of FIG. 1.

FIG. 3 is a fragmentary sectional view taken along the line 3—3 of FIG. 1.

Figure 4:
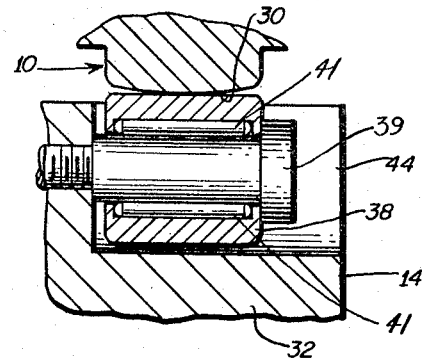
FIG. 4 is a fragmentary sectional view taken along the line 4—4 of FIG. 1.

Generally, the mechanism of the present invention comprises an axially elongated lead screw rotatably supported at both ends and a nut received on the screw for axial movement therealong. The nut includes a frame or body, and at least three rotatable bearing members carried by the frame engage the periphery of the screw to radially restrain the frame relative thereto. Adjustable coupling between the screw and the nut is accomplished by one or more drive members carried by the nut frame and engaging the thread on the screw so that rotation of the screw in either direction relative to the nut causes axial movement of the nut. Means are provided for adjusting the engagement between the bearing members and the screw to reduce radial play and to eliminate chatter or vibration. Means are also provided for adjusting the thread engaging drive member or members relative to its nut frame to eliminate or minimize backlash or axial play between the nut and the screw and/or to adjust the axial position of the nut relative to the screw for a given angular position of the screw.

Referring now to the drawing and particularly to FIGS. 1 and 2, an apparatus embodying the invention, and adapted for use on the X-Y plotter of the previously mentioned copending patent application, is shown to comprise a lead screw and a nut generally indicated at 10 and 12, respectively. The nut includes a generally L-shaped frame 14 which is drivingly connected with the screw in a manner to be hereinafter further described and which has the load or driven apparatus attached thereto. This load is partially indicated at 15 in FIG. 2 and may, for example, comprise the print head of the plotter. The plotter, which is not shown, includes means for supporting the screw 10 for rotation about its longitudinal axis and includes an elongated generally rectangular guide plate or way 16 arranged parallel to the screw 10 and fixed relative to the longitudinal axis thereof. A suitable drive means is also provided for rotating the screw about its longitudinal axis. The nut frame carries rollers which engage the way 16 to prevent rotation of the nut frame about the axis of the screw as the screw is rotated. In the illustrated embodiment a sufficient number of way-engaging rollers are provided to restrain the nut frame to rectilinear movement along the length of the way and the way is actually relied upon as the main support for the nut. Also, rollers of the illustrated nut which engage the periphery of the screw tend more to support the screw and to restrain it against vibration or whirling than to support the nut from the screw. This arrangement need not, however, always be followed and in other applications the screw may provide the main support for the nut with an accompanying way or other similar means serving only or primarly to prevent rotation of the nut frame.

Considering first in more detail the illustrated way-engaging rollers, there are four substantially identical groups of three such rollers with the three rollers of each group being spaced from the other groups and arranged to respectively engage three different surfaces of the way 16. Two such groups of rollers are shown in FIG. 2 with each group including a top roller 18, a bottom roller 20 and a side roller 22. The top and bottom rollers 18, 18 and 20, 20 are supported for rotation about horizontal axes and the side rollers 22, 22 are supported for rotation about vertical axes. The top and bottom rollers respectively engage and roll along the top and bottom surfaces of the way 16 and the side rollers engage and roll along the vertical side surfaces thereof. The two groups of rollers shown in FIG. 2 are located near the right-hand corners of the frame 14 as viewed in FIG. 1 and the two other groups are located near the left-hand frame corners, the frame including a portion which passes underneath the way 16 to receive the two groups of rollers on the side of the way remote from the screw. Thus, it will be obvious from FIGS. 1 and 2 that the nut 12, which carries the print head or other load 15, is supported for translational or rectilinear movement on the way 16, with the way serving to support the weight of the nut and the load so that no appreciable amount of weight bears upon the screw 10 and also serving to prevent rotation of the nut with the screw.

Figure 7:
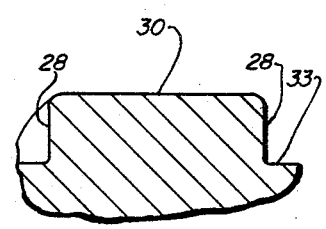
FIG. 7 is a fragmentary sectional view taken along the line 7—7 of FIG. 1.

The lead screw 10 is formed to include a single helical thread of such axial length and pitch as to provide a substantial axial gap or groove between two adjacent convolutions thereof, the thread having an outer land and the gap or groove being defined at least in part by shoulders on the thread extending inwardly from the land. Although the exact shape of the thread may vary somewhat without departing from the invention it preferably, and as shown best in FIGS. 7 and 8, has a rectangular cross section with an outer land 30 generated by a line parallel to the axis of the screw and with two shoulders 28, 28 each generated by the simultaneous rotation and axial movement a line normal to the screw axis. The land 30 is relatively wide and has an axial length equal to approximately one-half the pitch of the thread so as to define a helical groove 33 between adjacent thread convolutions also having an axial length approximately equal to one-half the thread pitch.

Figure 8:
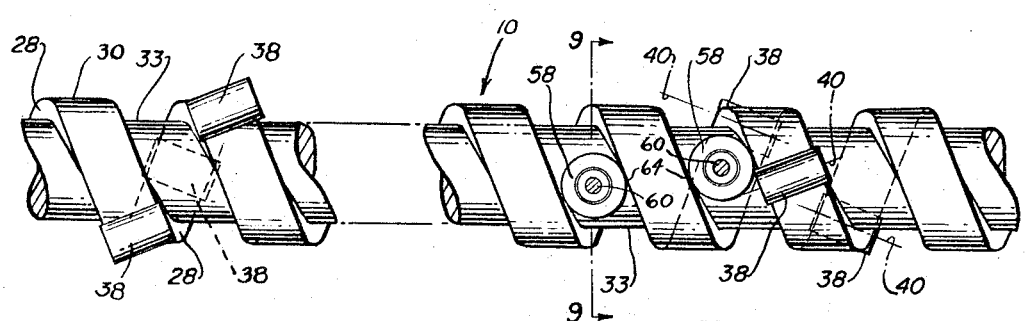
FIG. 8 is a bottom view of the lead screw showing the positions of the land rollers and shoulder rollers relative thereto.
Figure 9:
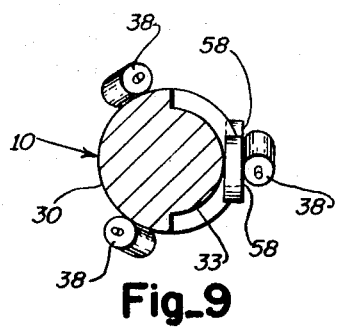
FIG. 9 is a sectional view taken along the line 9—9 of FIG. 8.

The nut 12 includes at least one group of at least three rollers which engage the land 30 of the screw 10 to restrain the nut frame against radial movement relative to the screw. In the illustrated case two groups of three such rollers are provided with the two groups being located at opposite ends of the nut frame. To accommodate these two sets of rollers, the frame includes two housing portions 32 and 34 axially spaced from one another along the screw and each of which includes an axial bore for receiving the screw. Each of the housing portions 32 and 34 carries an associated group of land rollers which are indicated at 38, 38 and which are arranged to engage the land 30 at angularly spaced points therealong. As shown in FIGS. 2, 8 and 9 the three land rollers of each housing portion are substantially equally angularly spaced relative to one another and engage the same thread convolution so as to be disposed over a relatively short axial length of the screw. The housing portions 32 and 34 each include three roller recesses 44, 44 communicating with the associated screw receiving bore and designed to receive the land rollers with the axes thereof inclined relative to the bore axis in a manner hereafter described.

The rollers 38, 38 may vary widely in construction, and as shown best in FIG. 4, each such roller may for example comprise a generally cylindrical roller bearing journalled on the shank of a stud bolt 39 for rotation about an axis generally normal to the helical path of the screw thread at the point of engagement therewith. The roller 38 is supported on the stud 39 by a plurality of needle bearing elements 41, 41 and the stud is threaded into the frame 14 to support the roller with a peripheral portion thereof protruding beyond the associated recess 44 into engagement with the thread land.

Referring now to FIG. 8, which shows the rollers without their supporting frame, it will be seen that at any angular position of the screw 10, the three land rollers 38, 38 of each group are arranged so as to engage the land 30 along lines of contact 40, 40 which are generally normal to the helix of the thread. This arrangement produces smooth rolling engagement between the rollers and the screw to minimize friction as the screw rotates within the nut frame. Preferably the rollers of each group are substantially equally angularly spaced, and also the rollers of one group are preferably angularly offset from the rollers of the other group so that the six rollers engage the screw at different angular positions. This arrangement maximizes the radial restraint upon the screw and reduces its tendency to vibrate or whirl.

Figures 5, 6:
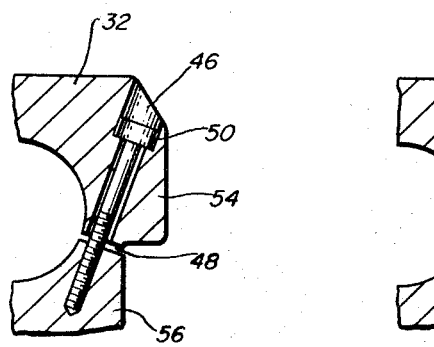
FIG. 5 is a fragmentary sectional view taken along the line 5—5 of FIG. 1.
FIG. 6 is a fragmentary sectional view taken along the line 6—6 of FIG. 1.

Adjustment of the engagement between the land rollers and the screw to eliminate or minimize radial play and resulting screw vibration is made possible by substantially identical adjustment means provided on both the housing portions 32 and 34 of the nut frame. Referring particularly to FIGS. 2, 5 and 6 this adjustment means, indicated generally at 46 and described with reference to the first housing portion 32, is shown to comprise a slot 48 in the housing portion and two adjustment screws 50 and 52, the slot extending generally axially and radially of the housing bore and passing completely through the housing wall. The screws are employed to vary the width of the slot and thereby change the general diameter of the housing bore to collectively alter the radial position of the land rollers relative to the screw. The screw 50 is positioned generally normal to the slot 48 and passes loosely through an aperture in the upper portion 54 of the housing into threaded engagement with a threaded opening in the lower portion 56. This provides a means for closing or reducing the width of the slot. The screw 52 is similarly positioned, but is threadably received in the upper portion 54 of the housing and extends therethrough to abut the lower portion 56, thereby providing a means for opening or increasing the width of the slot. Accordingly, it will be apparent that the general diameter of the housing bore may be varied by adjusting the screws 50 and 52 and that this will cause the land rollers 38, 38 associated with the housing to be adjusted radially inwardly or outwardly toward or away from the screw 10. In this manner the land rollers may be brought into full engagement with the screw to eliminate radial play between the screw and the nut and possible vibration.

Since the screws 50 and 52 are arranged to exert opposing forces upon the slot defining frame housing portions 54 and 56, it should be evident that these screws may also be employed to lock the frame portions in a selected adjusted position. For example, if the screw 50 is tightened to move the land rollers 38, 38 into selected engagement with the screw, the adjustment thereby attained may be maintained by thereafter tightening the screw 52. Conversely, an adjustment affected by tightening the screw 52 is thereafter maintained by tightening the screw 50. Thus, the two screws cooperate to provide a means for locking the land rollers in selected adjusted position relative to the screw.

A driving coupling between the nut frame and the screw is accomplished by one or more drive members carried by the frame and engaging the sides or shoulders of the screw thread so that rotation of the screw in either direction relative to the frame imparts translatory motion to the nut frame. In the presently preferred and illustrated embodiment of the invention, a pair of rollers 58, 58, referred to as shoulder rollers, are carried by the nut for this purpose. Each shoulder roller 58 is disposed within a gap or groove formed by adjacent thread convolutions and is arranged to engage an associated thread shoulder 28.

The shoulder rollers may vary widely in their construction and manner of attachment to the nut frame, and in the present instance each is shown to comprise a ball bearing unit press fitted onto an associated journal 60 for rotation about an axis generally normal to the axis of the screw 10 to affect smooth rolling engagement and minimal friction between it and the associated thread shoulder. Each journal 60 is eccentrically located on one end of a stud 62 which extends through a counterbored opening in the frame 14. At its outer end each stud is headed and slotted, as shown. A set screw 64 provides a locking means for holding each shank against angular movement relative to the frame to maintain the associated shoulder roller in any selected position of adjustment.

From FIG. 3 it will be obvious that due to the eccentricity of the journal 60 relative to the axis of the stud 62 the roller 38 may be moved to various different axial positions relative to the screw 10 by rotating the stud. Thus, an adjustment means is provided for moving each of the shoulder rollers toward and away from the associated shoulder of the screw thread, and by this adjustment axial play or backlash between the nut and the screw may be eliminated or minimized. The position of the shoulder rollers relative to the frame and the axial spacing between the rollers may vary. Preferably, however, the two rollers, as shown best in FIG. 8, are arranged to engage the same convolution of the thread. Further and as shown, the axes of the two rollers are parallel to one another and so angularly spaced from one another relative to the axis of the lead screw that the two points 64, 64 at which the two rollers respectively engage the associated shoulders 28, 28 are substantially located in a common plane passing through the axis of the lead screw. Arrangement of the drive rollers 58, 58 in this preferred manner results in smooth rolling engagement between such rollers and the screw.

The invention claimed is:

1. In a lead screw and nut mechanism the combination comprising an axially elongated lead screw having a helical thread, a nut frame arranged for axial movement along said thread, at least three rotatable bearing members carried by said nut frame and engaging angularly spaced points on the periphery of said screw to restrain said frame against radial movement relative to said screw, and a drive member carried by said nut frame and engaging said thread for axially moving said frame relative to said screw when said screw is rotated in either direction relative to said frame.

2. The combination defined in claim 1 further characterized by adjustment means for radially moving said bearing members toward and away from said screw.

3. The combination defined in claim 1 wherein said thread has a generally rectangular cross section including a generally flat axially extending land, said bearing members being rollers having generally cylindrical faces engageable with said land, each of said rollers being supported for rotation about an axis generally normal to the sides of said land at the point of engagement therewith.

4. In a lead screw and nut mechanism the combination comprising an axially elongated lead screw having a thread, a nut frame arranged for axial movement along said screw, at least three rotatable bearing members carried by said nut frame engaging angularly spaced points on the periphery of said screw to restrain said frame against radial movement relative to said screw, and at least one other roller carried by said frame and supported thereby for rotation about an axis generally normal to the axis of said screw, said one other roller being arranged to engage said thread so as to axially move said frame relative to said screw when said screw is rotated in either direction relative to said frame.

5. In a lead screw and nut mechanism the combination comprising an axially elongated lead screw having a thread with a pair of spaced apart shoulders, a nut frame arranged for axial movement along said screw, at least three rotatable bearing members carried by said frame and arranged to engage angularly spaced points on the periphery of said screw, and a pair of shoulder rollers carried by said frame, each of said shoulder rollers being arranged for rotation about an axis generally normal to the axis of said screw, each of said shoulder rollers being disposed within the groove formed by two adjacent thread convolutions and arranged to engage a respectively associated one of said thread shoulders for axially moving said nut frame relative to said screw when said screw is rotated in either direction relative to said frame.

6. The combination defined in claim 5 further characterized by adjustment means for moving each of said shoulder rollers toward and away from its associated thread shoulder to adjust axial play between said screw and said nut frame.

7. The combination defined in claim 5 further characterized by eccentric means for moving each of said shoulder rollers toward and away from an associated said shoulder to adjust axial play between said frame and said screw, said eccentric means including a stud rotatably supported in said nut frame and having a journal for the associated bearing member eccentrically located on one end thereof, and locking means for securing of said stud in a selected position relative to said frame.

8. The combination defined in claim 5 further characterized by said shoulder rollers being arranged with their axes parallel to one another and so angularly spaced from one another relative to the axis of said lead screw that the two points at which said two shoulder rollers respectively engage the associated shoulders of said thread are substantially located in a common plane passing through the axis of said lead screw.

9. In a lead screw and nut mechanism the combination comprising an axially elongated lead screw having a thread, a nut having a frame arranged for axial movement along said screw and including first and second housing portions spaced from one another axially of said screw, a first group of at least three rotatable bearing members carried by said first housing portion and a second group of at least three rotatable bearing members carried by said second housing portion with the bearing members comprising each of said groups engaging angularly spaced points on the periphery of said screw to radially restrain said frame relative to said screw, and at least one drive member separate from said rotatable bearing members carried by said frame and engageable with said thread to axially move said frame relative to said screw when said screw is rotated in either direction relative to said frame.

10. In a lead screw and nut mechanism the combination comprising a nut frame having a housing portion with a bore extending therethrough, said housing portion further having a slot extending along the full length thereof and passing completely through the housing wall generally radially of the axis of said bore, at least three rotatable bearing members carried by said frame and having portions extending itno said bore, a lead screw having a thread and which lead screw is disposed in said bore with said bearing members engaging angularly spaced points on the periphery thereof, screw means for varying the width of said slot to vary the general diameter of said bore and move said bearing members toward and away from said lead screw, and a drive member separate from said bearing members and carried by said frame so as to engage said thread to axially move said frame relative to said lead screw when said lead screw is rotated in either direction relative to said frame.

11. The combination defined in claim 10 wherein said screw means comprises two screws, one of said screws being adjustable to increase the general diameter of said bore and to thereby move said bearing members away from said lead screw, the other of said screws being adjustable to decrease the general diameter of said bore to move said bearing members toward said lead screw.

References Cited

UNITED STATES PATENTS

| | | | |
|---|---|---|---|
| 2,938,400 | 5/1960 | Gondek | 74—424.8 |
| 2,938,401 | 5/1960 | Wise | 74—424.8 |
| 3,014,379 | 12/1961 | Wise | 74—424.8 |
| 3,133,453 | 5/1964 | LaPointe | 74—424.8 |
| 3,296,880 | 1/1967 | Maroth | 74—424.8 |

DONLEY J. STOCKING, *Primary Examiner.*

L. H. GERIN, *Assistant Examiner.*